Figure 1:
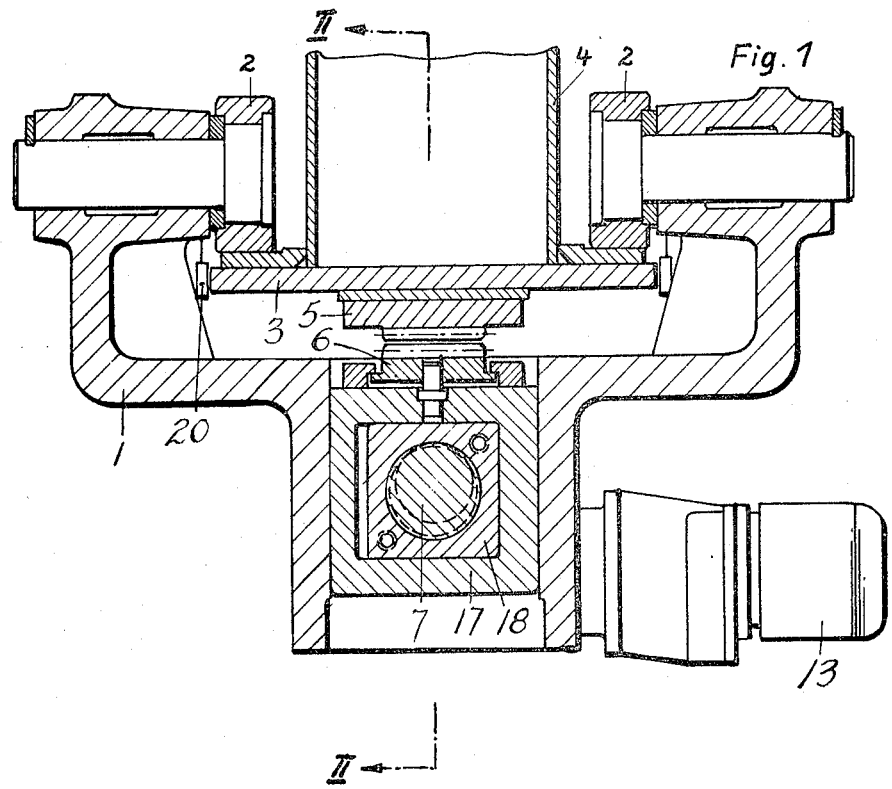

United States Patent Office 3,267,787
Patented August 23, 1966

3,267,787
MEANS COOPERABLE WITH A SHEAR OR SAW ASSEMBLY FOR ASSURING A PROPER LENGTH CUT OF ROLLED STOCK
Willi Benz, Neuss/a, Germany, assignor to Schloemann Aktiengesellschaft, Dusseldorf, Germany
Filed Aug. 25, 1964, Ser. No. 392,007
Claims priority, application Germany, Aug. 27, 1963, Sch 33,765
7 Claims. (Cl. 83—419)

The present invention relates to the art of rolling mills and more particularly has reference to means cooperable with a shear or saw assembly for assuring a proper length cut of the rolled stock by such shear or saw assembly.

More specifically, the invention pertains to mobile carriage means located behind the shear or saw assembly and which is so interrelated to the shear or saw assembly as to be capable of adjusting the lengths of the cut rolled stock within fine limits.

In rolling mills, the rolled stock frequently must be subdivided or cut and, in modern rolling mill installations, it is viewed as being of paramount importance that the predetermined cut lengths be as accurate as possible. The adjustment of the desired cut lengths is effected via what may be termed abutment carriage means which may be moved behind the shear or saw assembly over the discharge zone of the mill conveyor path with such carriage means being provided with an arresting shield or the like capable of being swung into the conveyor path of the rolled stock to be cut. In adjusting the carriage means, the same is so positioned that the distance between the arresting shield lowered into the conveyor path and the shear or saw assembly corresponds to the desired cut length of the stock. In such position, the carriage means is locked so that the rolled stock upon reaching the roller table is stopped by the lowered shield and brought to a standstill. The stock is thereupon cut by the shear or saw assembly and after the arresting shield has been swung away from the conveyor path, the thus cut length of stock is conveyed by the roller table. The locking of the carriage means as well as the raising and lowering movements of the arresting shield may be effected manually or by mechanical actuating devices of various types.

In connection with an older known carriage means, the locking has been achieved by means of a lock bolt carried by the carriage and which lock bolt coacts with a stationary or fixed locking strip mounted along the roller bed. Such a locking action by virtue of stop latches and the like does provide for great stability but since the carriage means is adjustable only at distances corresponding to the slot spacings, the same is objectionable in this regard.

However, to be in a position to adjust the cut lengths to an infinite number of sizes, more recent assemblages have departed from the above described arrangement and have provided for the requisite locking by way of eccentric disks or the like. In these latter assemblages, it has been customary to position the eccentric disks opposite the pairs of wheels whereby the clamping pressures act upon the wheeled gear and to avoid this needless strain on the wheeled gear, it has been proposed to locate the eccentric disks horizontally in such a fashion that the disks coact laterally upon the carriage support. In this particular type of eccentric disk mounting, the clamping pressures are absorbed by the side walls of the carriage which means that the carriage must be of a substantially more robust character and consequently of considerably heavier weight. Moreover, all of the locking arrangements utilizing eccentric disks possess the objectionable characteristic that the tightening of the disks is accompanied by undesired adjusting movements which are irregular and not predictable and hence frequently results in inaccuracies in the lengths of the cuts.

By virtue of the present invention, the foregoing objectionable features currently existing in the art are overcome by an assemblage having an infinite and assured accurate adjustment of the carriage means. In order to solve the problem, the above described stop latch arrangement has been employed and comprehends locking the carriage by means of a lock bolt means mounted on the carriage in a locking component fixedly mounted along the roller bed and having equally spaced recesses or slots provided at correspondingly regular intervals.

More particularly, the lock bolt means for the infinite number of adjustments for the stock cutting can be shifted or displaced in the direction of carriage travel and by reason of such shifting, it is also possible so adjust the carriage at any desired intermediate position which may not be included in the sub-division of the locking strip.

To maintain as small as possible the spacing on the locking strip and at the same time ensuring an engaging surface in the recesses or slots as well as on the lock bolt means which is sufficiently large for secure engagement of the lock bolt means, the invention further provides a locking strip stationarily attached on the roller bed which is defined by a toothed rack and a lock bolt means mounted on the carriage defined by a correspondingly formed rack segment with such rack arrangement also being utilized as a drive means for the carriage such as by way of a drivable pinion operably associated with the rack and driven by motor means on the carriage.

The invention also comprehends mounting the lock bolt means on an eccentric shaft for effecting its engagement with the locking strip and the lock bolt means and eccentric shaft being shiftable or displaceable in the direction of travel of the carriage with such shiftable movement being effected by mounting the eccentric shaft axially of the carriage and providing the shaft with a nut seated on a threaded pin of the shaft which is held against rotation during shifting and which nut constitutes a worm wheel which meshes with a worm shaft driven by an electric motor.

The invention additionally provides for the swinging of the eccentric shaft of the engagement of the lock bolt means by means of a turning gear independent of the adjustment gearing which turning gear by being in constant engagement with the eccentric shaft assures that the shaft mounting cannot rotate which is essential in the axial shifting of the shaft.

Since in the swinging of the eccentric, the shaft shifts in the thread of the worm nut the lock bolt means in order to prevent any uncontrollable shifting is, according to the invention, operably connected with the eccentric shaft threadedly via a bearing component with the pitch of such thread corresponding to that of the adjusting thread but with the pitch of the respective threads being in opposite directions so that the shifting experienced by the shaft in the swinging of the eccentric is compensated for relative to the position of the lock bolt means.

Figure 3:
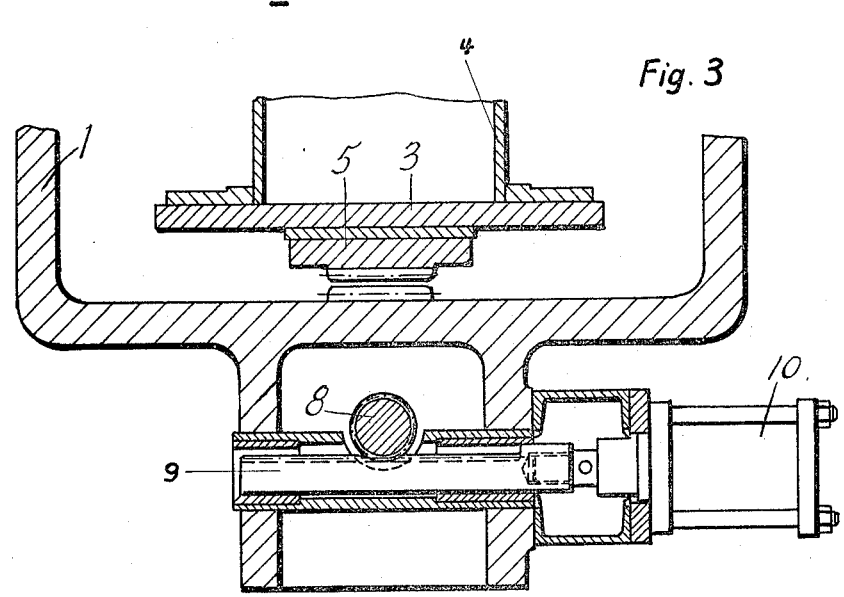
Figure 2:
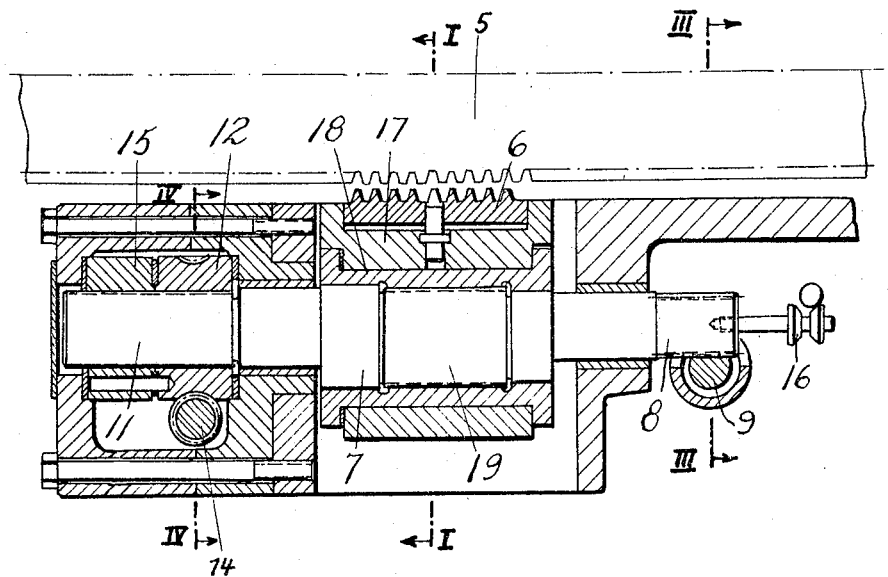
Figure 4:
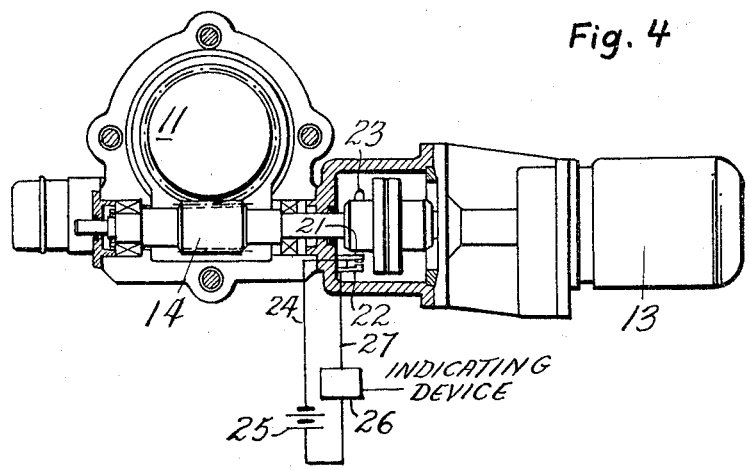

Further objects and advantages of the invention will become more readily apparent to one skilled in the art from the following detailed description and annexed drawings, in which drawings:

FIG. 1 is a vertical sectional view through a carriage showing the carriage mounting on a beam positioned along a roller bed, FIG. 2 is a view taken along the line II—II of FIG. 1, the view looking in the direction of the arrows and illustrating the mounting of the eccentric shaft which carries the lock bolt means, FIG. 3 is a view taken along line III—III of FIG. 2, the view looking in the direction of the arrows and illustrating the means for effecting the swinging of the eccentric shaft, and FIG. 4 is a view taken along line IV—IV of FIG. 2, the view looking in the direction of the arrows and illustrating means for effecting the shifting of the lock bolt means.

As shown in FIG. 1, a carriage 1 preferably constructed of heavy cast steel is provided with four wheels 2 which are guided on a bottom flange or track 3 of a support beam 4 disposed above the discharge roller bed. The drive is accomplished through a pinion by means of an electric motor mounted in the carriage 1 with the pinion engaging a toothed rack 5 carried by the flange or track 3, although other carriage drive means such as a rotatable chain or the like may be employed. The carriage 1 is guided in the lateral directions by means of slide blocks 20 which bear against the side edges of the flange 3 and absorb any impacts which may arise due to an oblique run of the material to be cut.

After adjustment to the desired cutting length, the carriage 1 is locked by causing a lock bolt means on the carriage to engage a locking strip on the flange 3 of the beam 4. The locking strip is advantageously defined by a toothed rack so that the rack 5 which enables the carriage to be driven can also function as the locking strip. The lock bolt means on the carriage 1 is in the form of a toothed rack segment 6 (FIG. 2) corresponding to the rack 5. The use of the rack 5 as the locking strip results in a relatively small division and by means of the rack segment 6, the length of which is determined by the designer, a sufficiently large engaging surface can be provided without any difficulties and this is true for even the strongest load factor.

In order to permit the rack segment 6 to engage the rack 5, it will be seen that the segment 6 is mounted on an eccentric shaft 7. The swinging in and out of the shaft for effecting the locking and unlocking of the carriage 1 respectively, is achieved by means of a separate drive. More specifically, as shown in FIGS. 2 and 3, one end of the shaft 7 is formed as a pinion 8 which is engaged by a toothed rack 9. The rack 9 may be reciprocated by a compressed air cylinder 10 which functions in both directions and by maintaining the respective control pressure in the cylinder the eccentric can be practically arrested.

Of course, an orderly engagement of the rack segment 6 with the rack 5 is only possible when a tooth meets a gap and if, for example, the gear tooth arrangement is predicated on a spacing of one inch, then the foregoing condition is readily fulfilled with the adjustment of the carriage 1 on a full inch basis. However, to provide for adjustment to any desired intermediate measurements, the rack segment 6 is capable of shifting movement in the direction of travel of the carriage. Hence, it thus becomes possible if, for example, the carriage 1 is to be adjusted to a cutting length of 100½ inches to again bring about the proper tooth-gap condition in spite of the intermediate measurement by shifting the rack segment 6 by one-half inch.

The shifting or displacing of the rack segment 6 is accomplished by the shaft 7 and it will be noted that such shaft is mounted to extend the carriage in its direction of travel. As illustrated in FIG. 2, the other end of the shaft 7 is in the nature of a threaded spindle 11 on which is seated a nut 12 in the form of a worm wheel. The nut 12 is rotatable in its bearing by means of a worm shaft 14 driven by an electric motor 13 (FIG. 4) so that with the shaft 7 being held against rotation, an adjustment of the entire shaft together with the rack segment 6 can be effected. The non-rotational mounting of the shaft 7 results from the constant engagement between the toothed rack 9 and the pinion 8. For equalizing the play in the thread between the spindle 11 and the nut 12, a counter-nut 15 with an intermediate disk is threaded onto the spindle 11 and drawn up against the nut 12. The maximum path of shifting of the shaft 7 and the rack segment 6 amounts to approximately 1½ times the division of the toothed rack and the two terminal positions are limited by an end switch 16.

The pitch of the spindle 11 as well as that of the worm wheel 12 and worm shaft 14 is so designed that one revolution of the worm shaft 14 corresponds to an adjusting path of the rack segment 6 of approximately 1/50–1/75 of the division of the rack 5. There is further provided an indicating device at the control desk on which the respective position of the rack segment 6 and the path of shifting of the shaft 7 can be read. For this purpose, it is desirable to operably connect the worm shaft 14 to an impulse generator which generates an impulse with each complete revolution of the worm shaft. Of course, the device for indicating the position of the rack segment can be effected by other means.

A suitable impulse generator and indicating device may, as shown in FIG. 4, comprise a circuit breaking means including a movable contact 21 and a fixed contact 22 disposed adjacent the worm shaft 14. A cam 23 provided on the shaft 14 rotates therewith and engages the movable contact 21 to engage the fixed contact 22 once during each revolution of the shaft 14. A conductor 24 is connected between the movable contact 21 and one side of a suitable voltage source 25 with the opposite side of the voltage source 25 being connected to a conventional electrical impulse counter 26. To complete the circuit a conductor 27 is connected between the impulse counter 25 and the fixed contact 22. In operation, the contacts 21 and 22 close once during each revolution of the shaft 14 thereby transmitting an impulse to the impulse counter 26 which indicates the total number of impulses and therefore the number of revolutions of shaft 14. From this information the position of the rack segment 6 and axial movement of the shaft 7 can be determined.

The position of the carriage 1 and the adjusted cutting length respectively, can be read from a longitudinal scale mounted on the support beam 4 by means of an indicator mounted on the carriage 1. It is further desirable to provide an electric accuracy indicator such as by a digital revolving transmitter coupled to a gear wheel cooperable with the rack 5 for generating an impulse per millimeter of travel.

Since, with the engagement of the rack segment 6, the shaft 7 together with the threaded spindle 11 is given approximately one-half a revolution, an undesirable axial shifting of the shaft 7 and rack segment 6 occurs relative to the previously adjusted measured value. To avoid such effect, the rack segment 6 is mounted in a slide block 17 carried by the carriage 1 for upward and downward movement and for being urged axially in a divided bearing 18. The bearing 18 is threadedly connected with the eccentric and thread 19 on the eccentric has the same pitch as the thread on the spindle 11 but extending in the opposite direction. Thus, when the eccentric is being swung outwardly, the rack segment 6 is moved back the same amount as the shaft 7 has been shifted axially because of the spindle 11 and nut 12.

By virtue of the present invention, the carriage can be locked at any desired location free of slippage and the precision adjustment, namely the shifting of the lock bolt means on the carriage, can be realized while the carriage is still being moved into position for enabling an extremely rapid operation.

The invention is not to be confined to any strict conformity to the showings in the drawings but changes or modifications may be made therein so long as such changes or modifications mark no material departure from the spirit and scope of the appended claims.

I claim:

1. In an assemblage for adjusting the cutting length of rolled stock behind a cutting means for a rolling mill train, a discharge roller bed, a support beam mounted above said discharge roller bed, a flange carried by said beam, a wheeled carriage movable along said flange and capable of being locked to the beam the desired distance behind the cutting means for determining the cutting length of the stock, a toothed rack constituting a locking strip fixedly mounted on said flange, an eccentric shaft mounted axially on said carriage in the path of movement thereof, a toothed rack segment complementary to said toothed rack on said shaft and constituting lock bolt means, a threaded spindle on said shaft, a worm wheel on the spindle, a worm shaft engaging said worm wheel whereby rotation thereof shifts said eccentric shaft and rack segment axially, and further gear means operably connected with said eccentric shaft for swinging said shaft for the engagement of the lock bolt means independent of said worm and worm wheel with such gear means preventing rotation of the shaft during shifting of the shaft.

2. The assemblage as claimed in claim 1 in which said rack segment is threadedly connected to the eccentric shaft by a bearing member with such thread having the same pitch as that of the spindle but being in the opposite direction.

3. The assemblage as claimed in claim 2 in which said rack segment is shiftable by an amount at least corresponding to the gaps of the toothed rack.

4. In an assemblage for adjusting the cutting lengths of rolled stock behind a cutting means for a rolling mill train, a discharge roller bed, a carriage movable relative to the discharge roller bed and capable of being locked with respect to the discharge roller bed the desired distance behind the cutting means for determining the cutting lengths of the stock, a locking strip comprising a toothed rack fixedly mounted along the discharge roller bed, an eccentric shaft mounted for rotation on said carriage and for axial shifting movement in the path of movement of said carriage, a lock bolt means comprising a rack segment mounted on said eccentric shaft for movement radially of the axis of said shaft into and out of engagement with said locking strip and for axial shifting movement with said shaft, a threaded spindle on said shaft, a worm wheel threadedly engaging said spindle, a worm shaft engaging said worm wheel, whereby with said lock bolt means in engagement with said locking strip and upon rotation of said worm shaft said eccentric shaft and lock bolt means will be shifted axially with respect to said carriage to move said carriage with respect to said locking strip, thereby providing an infinite adjustment of said carriage for cutting lengths of stock, and means for preventing rotation of said eccentric shaft during said shifting movement.

5. An assemblage as defined in claim 4 and including an indicating device for indicating the position of said lock bolt means and the axial movement of said eccentric shaft, an impulse transmitter for actuating said indicating device and means on said worm shaft for actuating said impulse transmitter once during each revolution of said worm shaft.

6. An assemblage as defined in claim 4 in which said lock bolt means is threadedly received on said eccentric shaft by a thread having the same pitch as the thread of said spindle but being in the opposite direction.

7. An assemblage as defined in claim 6 in which said lock bolt means is shiftable by an amount at least equal to the pitch of the teeth of the rack segment.

References Cited by the Examiner
UNITED STATES PATENTS 1,142,974 6/1915 Leonhauser _____ 83—391
2,693,115 11/1954 James et al. _____ 74—570 X ANDREW R. JUHASZ, *Primary Examiner.*